Aug. 2, 1955     R. E. DAVIS     2,714,288
HYDRAULIC DRIVE
Filed March 12, 1954     2 Sheets-Sheet 1
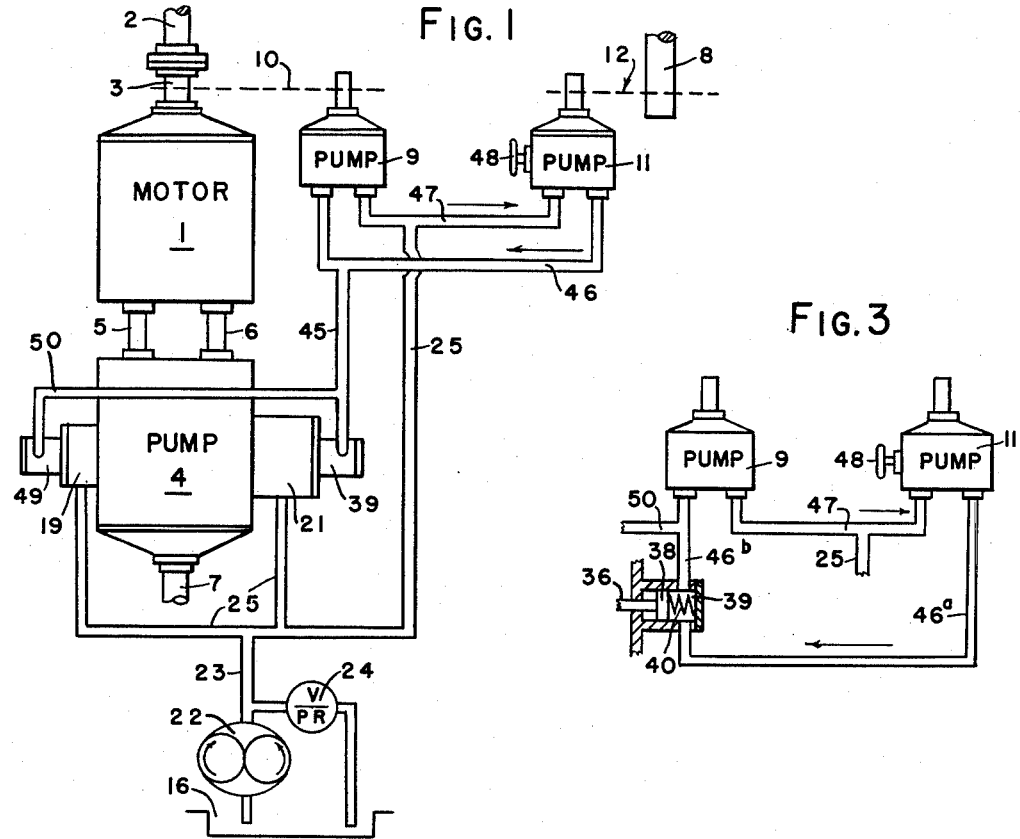
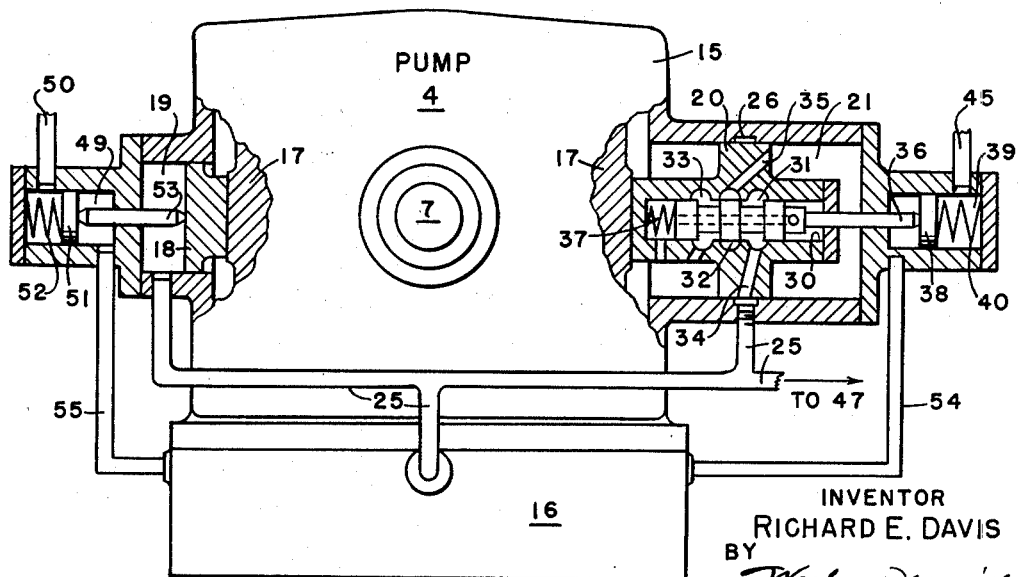
INVENTOR
RICHARD E. DAVIS
BY
*Wesley P. Merrill*
ATTORNEY

United States Patent Office 2,714,288
Patented Aug. 2, 1955

2,714,288
HYDRAULIC DRIVE

Richard E. Davis, Summit, Wis., assignor to The Oilgear Company, Milwaukee, Wis., a corporation of Wisconsin Application March 12, 1954, Serial No. 415,853

12 Claims. (Cl. 60—52)

This invention relates to hydraulic drives of the type employed to drive a machine or a part of a machine at a speed proportional to the speed of a reference element such as another machine or another part of the same machine.

The type of drive to which the invention relates in particular includes a hydraulic motor for driving a machine or a part of a machine, a power pump for supplying motive liquid to the motor to energize it, a flow regulating member, a hydraulic servo-motor for shifting that member to vary the rate of flow of liquid from the pump to the motor to thereby vary the speed of the motor, a pilot pump driven by the motor, a second pilot pump driven by the reference element and fluid channels connecting the pilot pumps in series and to the servo-motor, such as the drive shown in Patent No. 2,105,824.

The relative speeds and displacements of the pilot pumps are such that the discharge rate of one pilot pump will be exactly equal to the intake rate of the other pilot pump when the speed of the driven machine or machine part bears a given ratio to the speed of the reference element but, when the speed of the machine or machine part varies relatively to the speed of the reference element, the volume of liquid discharged by one pilot pump will differ from the volume of liquid consumed by the other pilot pump and that difference in volume will cause the servo-motor to shift the flow regulating member and thereby correct the variation in speed and the resultant error in the phase relationship between the machine and the reference element.

The patented drive is very successful and will maintain the overall speed of a driven machine proportional to the overall speed of a reference element. However, in order to correct a variation in the relative speeds and the resultant phase error of the machine and the reference element, the difference between the volume of liquid discharged by one pilot pump and the volume consumed by the other pilot pump must be sufficient to cause the servomotor to move the flow regulating member through a distance great enough to effect correction of the variation in speed. Therefore, there is a slight time lag between the instant that a speed variation and a phase error occurs and the instant that the speed variation and the phase error are corrected.

The present invention has as an object to provide a hydraulic drive which will drive a member at a speed proportional to the speed of a reference element and will correct without appreciable time lag any variation in the relative speeds and any error in the phase relationship of the driven member and the reference element.

Another object is to provide a drive of the above type which is precise and accurate in operation.

Other objects and advantages will appear from the following description of the drives shown schematically in the accompanying drawings in which the views are as follows:

Fig. 1 is a circuit diagram of a drive in which the invention is embodied.

Fig. 2 is a view showing the power pump of Fig. 1 on a larger scale partly in end elevation and partly in central section.

Fig. 3 is a diagram illustrating a modification of the circuit shown in Fig. 1.

Figs. 1 and 2

Figure 4:
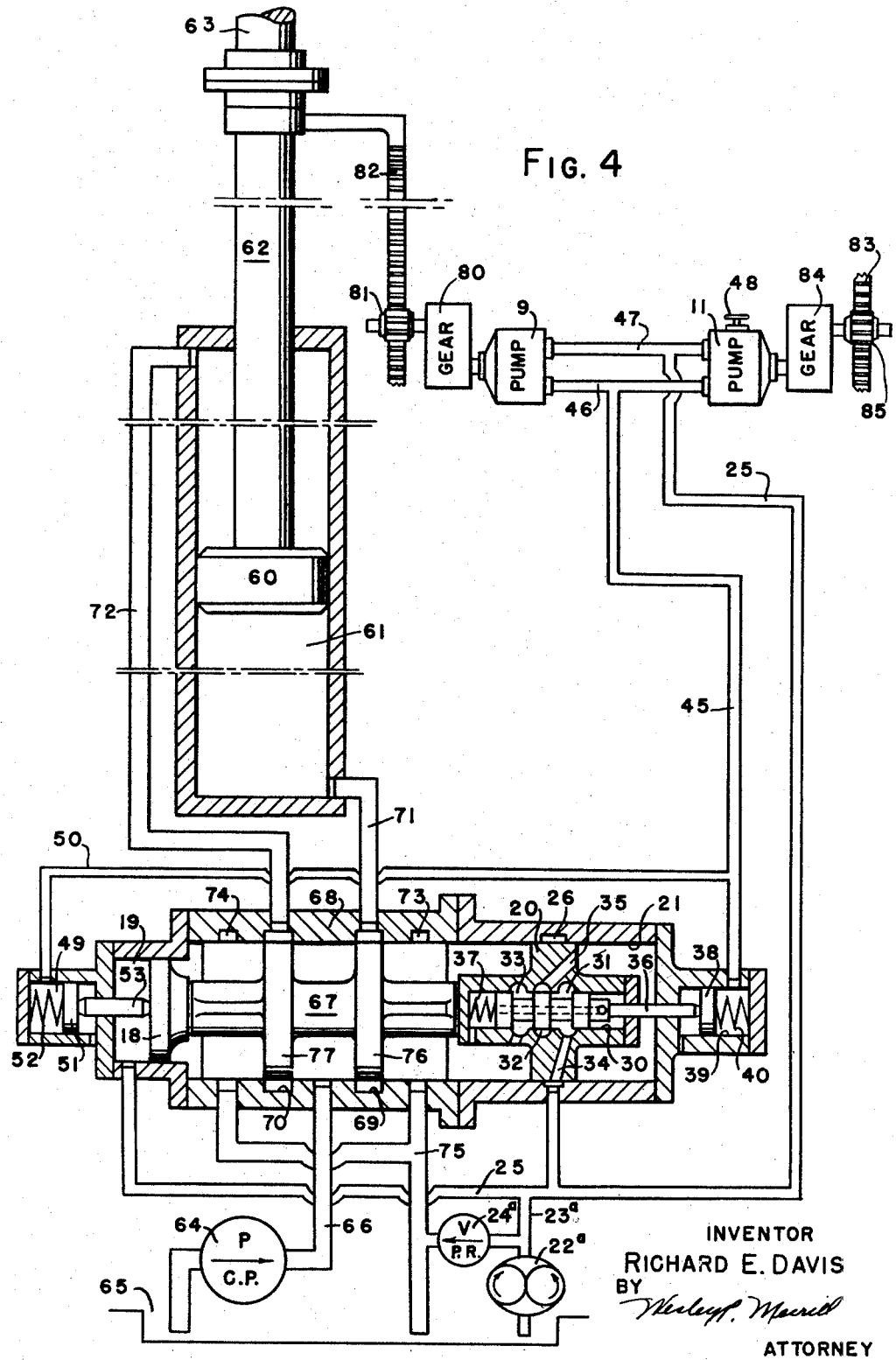
Fig. 4 is a diagram showing the invention applied to a drive which includes a reciprocating hydraulic motor.

The drive shown in Fig. 1 includes a rotary hydraulic motor 1 for driving a machine or a part of a machine which, since it forms no part of the invention, has not been illustrated except a portion of the drive shaft 2 thereof which has been shown connected to the shaft 3 of motor 1. Motive liquid for energizing motor 1 is supplied thereto by a variable displacement power pump 4 which is connected to motor 1 by two channels 5 and 6 and has a drive shaft 7 for connection to an electric motor or other power source not shown.

The speed of motor 1 and shaft 2 is maintained proportional to the speed of a reference element 8 by adjusting the displacement of pump 4 in response to signals provided by a hydraulic differential which includes a hydraulic tachometer or pilot pump 9, which is driven from shaft 3 at a speed proportional to the speed thereof by means of a suitable drive 10, and a second hydraulic tachometer or pilot pump 11 which is connected in series with pilot pump 9 and driven from reference element 8 at a speed proportional to the speed thereof by means of a suitable drive 12. Reference element 8 has been shown as being a shaft which may be a part of a machine or a machine section which is driven independently of the machine or machine section driven by motor 1 but reference element 8 may be a reciprocating element and pump 11 be driven therefrom as indicated in Fig. 4.

Pump 4 has been indicated as being a standard commercial pump provided with a special control. The pump is so well known that a complete description thereof is unnecessary. It is deemed sufficient to state herein that it has its mechanism arranged within a casing 15 which has been shown mounted upon a base or reservoir 16 containing a supply of liquid, that it includes a displacement varying member or slideblock 17 which is shiftable in a horizontal plane transversely of shaft 7 but is restrained from movement in any other direction, that pump displacement will be zero when slideblock 17 is in its neutral position and that pump displacement will gradually increase as slideblock 17 is moved toward the left from its neutral position.

The displacement of pump 4 is varied by a hydraulic servo-motor including a piston 18, which engages one side of slideblock 17 and is fitted in a cylinder 19 carried by casing 15, and a much larger piston 20 which engages the other side of slideblock 17 and is fitted in a cylinder 21 carried by casing 15.

Liquid for operating the servo-motor is supplied by a gear pump 22 which draws liquid from reservoir 16 and discharges it into a channel 23. The liquid discharged by gear pump 22 in excess of requirements is exhausted into reservoir 16 through a relief valve 24 which enables gear pump 22 to maintain a constant low pressure in channel 23.

Gear pump 22, channel 23 and relief valve 24 have been shown separate from pump 4 in Fig. 1 but in practice if they are arranged within casing 15, gear pump 22 is driven in unison with pump 4 and channel 23 extends from gear pump 22 through the bottom of casing 15 as is customary. Channel 23 has connected thereto a branched channel 25 which has one of its branches connected to cylinder 19 and another branch connected to cylinder 21 in communication with a groove 26 formed therein so that cylinder 19 and groove 26 are continuously supplied with liquid at gear pump pressure.

Piston 20 is provided with an axial bore 30 having three annular grooves or ports 31, 32 and 33 formed in the wall thereof. Port 31 communicates through a duct 34 with groove 26. Port 32 communicates through a duct 35 with the outer portion of cylinder 21. Port 33 is connected to drain as by being open to the inner portion of cylinder 21 which is open to the interior of casing 15.

Communication between port 32 and ports 31 and 33 is controlled by a pilot valve 36 having three spaced apart pistons formed thereon and closely fitted in bore 30. The center piston on valve 36 normally blocks port 32 and it has been shown as being of exactly the same width as port 32 but it may have a slightly negative lap.

The arrangement is such that a very slight movement of valve 36 toward the left will permit liquid to flow from groove 26 through duct 34, ports 31 and 32 and duct 35 into cylinder 21 and cause piston 20 to start to move slideblock 17 toward the left and to continue to move slideblock 17 toward the left as long as valve 36 continues to move but movement of piston 20 toward the left tends to close port 32 as fast as movement of valve 36 tends to open it so that movement of piston 20 and slideblock 17 ceases as soon as movement of valve 36 ceases. Movement of slideblock 17 toward the left increases pump displacement and causes piston 18 to eject liquid from cylinder 19 into channel 25. When port 32 is closed, the pressure in cylinder 19 tends to move piston 18 and slideblock 17 toward the right but is prevented from doing so by the liquid trapped in cylinder 21 by piston 20 the cross-sectional area of which is much larger than that of piston 18.

A very slight movement of pilot valve 36 toward the right will open port 32 to exhaust port 33 so that liquid can escape from cylinder 21 and permit piston 18 to start to move slideblock 17 and piston 20 toward the right to decrease pump displacement and to continue to move toward the right as long as valve 36 continues to move but movement of piston 20 toward the right tends to close port 32 as fast as movement of valve 36 tends to open it so that movement of slideblock 17 ceases as soon as movement of valve 36 ceases.

Pilot valve 36 is urged toward the right by a spring 37 which is arranged in bore 30 and holds the stem of valve 36 against a small control piston 38 which is fitted in a stationary cylinder 39 and urged against the stem of valve 36 by a weak spring 40. Control piston 38 will shift in one direction or the other and effect movement of pilot valve 36 in response to the speed of motor 1 varying relatively to the speed of reference element 8.

As shown, cylinder 39 is connected by a channel 45 to a channel 46 which connects the outlet of pilot pump 11 to the inlet of pilot pump 9, and the outlet of pump 9 is connected to the inlet of pump 11 by a channel 47. Channels 46 and 47 form with pilot pumps 9 and 11 a substantially closed hydraulic circuit which is kept flooded with liquid at a low pressure by liquid supplied thereto through a branch of channel 25 which is connected to channel 47.

The relative ratios of drives 10 and 12 and the relative displacements of pumps 9 and 11 are such that, when motor 1 is driving shaft 2 at the desired speed relatively to the speed of reference element 8, pump 9 will draw liquid out of channel 46 at exactly the same rate at which pump 11 discharges liquid into channel 46, at least one of the pilot pumps being provided with means for adjusting its displacement to thereby provide close adjustment of the control. As shown, pump 11 is provided with a handwheel 48 which may be turned to vary its displacement.

When the speed of shaft 2 decreases relatively to the speed of reference element 8 or when the speed of reference element 8 increases relatively to the speed of shaft 2, the volume of liquid discharged into channel 46 by pump 11 will exceed the volume of liquid drawn from channel 46 by pump 9 and the excess liquid will flow through channel 45 to cylinder 39 and cause piston 38 to move pilot valve 36 toward the left to increase the displacement of pump 4, as previously explained, and thereby increase the speed of motor 1 until it is driving shaft 2 at the correct speed at which time the intake rate of pump 9 will be the same as the discharge rate of pump 11 and further adjustment of pump 4 will cease.

Conversely, when the speed of shaft 2 increases relatively to the speed of reference element 8 or when the speed of reference element 8 decreases relatively to the speed of shaft 2, the volume of liquid discharged into channel 46 by pump 11 will be less than the volume of liquid drawn from channel 46 by pump 9 which will cause pump 9 to draw liquid from cylinder 39 and permit spring 37 to move pilot valve 36 and piston 38 toward the right. Moving pilot valve 36 toward the right permits piston 18 to move slideblock 17 toward the right and decrease the displacement of pump 4, as previously explained, and thereby decrease the speed of motor 1 until it is driving shaft 2 at the correct speed at which time the intake rate of pump 9 will be the same as the discharge rate of pump 11 and further adjustment of pump 4 will cease.

In the prior drives of the type in which the displacement of the main pump is varied in response to a variation in the relative speeds of two pilot pumps, one pilot pump has to continue to pump liquid into or out of a pump control cylinder until the speed variation is corrected, thereby causing a slight time lag between the instant that the variation occurs and the instant that the variation is corrected. The present invention substantially eliminates the time lag by maintaining substantially constant the volume of liquid acting upon the pump control piston so that the pilot pump need supply only enough liquid to start the control piston moving.

This may be accomplished in the pump control shown by connecting cylinder 39 to a stationary cylinder and providing the stationary cylinder with a movable wall or piston which moves with the slideblock and keeps the volume of liquid in the stationary cylinder and in cylinder 39 substantially constant. As shown, a cylinder 49 is fastened to the outer end of cylinder 19 and connected by a channel 50 to channel 45, a movable wall or piston 51 is fitted in cylinder 49, and a spring 52 urges piston 51 against one end of a push rod 53 which is slidable through the end wall of cylinder 19 and has its other end in contact with piston 18. The inner ends of cylinders 39 and 49 are drained as by being connected to reservoir 16 by channels 54 and 55 respectively.

The arrangement is such that, when an error in the phase relation between shafts 2 and 8 causes pilot pump 9 to tend to lag behind pilot pump 11, the liquid discharged by pump 11 will raise the pressure in cylinder 39 and enable piston 38 to move valve 36 a very short distance, say one thousandth of an inch, toward the left to permit gear pump liquid to enter cylinder 21 and cause piston 20 to move slideblock 17 toward the left to increase pump displacement and thereby correct the phase error. Piston 51 will move with slideblock 17 and will eject liquid from cylinder 49 through channels 50 and 45 into cylinder 39 to keep piston 38 and valve 36 moving until the phase error is corrected so that about all pump 11 has to do is to provide enough pressure to overcome the resistance of spring 37. The result is that there is not an appreciable time lag between the instant that the phase error occurs and the instant that the phase error is corrected.

The control will function in the same way but in opposite manner when an error in the phase relation between shafts 2 and 8 causes the pilot pump 9 to tend to run ahead of pilot pump 11. That is, the liquid drawn from channel 46 by pump 9 will drop the pressure in cylinder 39 enough to permit spring 37 to move pilot valve 36 toward the right and thereby permit piston 18 to move slideblock 17 toward the right. Pistons 38 and 51 will move with slideblock 17 and the liquid ejected from cylinder 39 by piston 38 will flow through channels 45 and 50 into cylinder 49.

Fig. 3

Instead of connecting control cylinder 39 to one side of the pilot pump circuit through a separate channel as shown in Fig. 1, cylinder 39 may be connected directly into one side of a pilot circuit which has some advantages because liquid flows continuously through cylinder 39 instead of being stationary except when the displacement of pump 4 is being adjusted.

As shown in Fig. 3, pump 9 has its outlet connected to the inlet of pump 11 by channel 47 to which a branch of supply channel 25 is connected the same as in Fig. 1, but the outlet of pump 11 is connected to one side of cylinder 39 by a channel 46ᵃ and the other side of cylinder 39 is connected to the inlet of pump 9 by a channel 46ᵇ to which channel 50 is connected. In that arrangement, the pressure prevailing between the pilot pumps acts directly upon piston 38 instead of acting thereon through a column of stationary liquid as in Fig. 1. Also, there is less danger of foreign matter accumulating in cylinder 39.

Fig. 4

A hydraulic drive embodying the invention may be employed to drive a reciprocable member of a machine and to maintain the speed of that member proportional to the speed of a reference element. As shown, a piston 60 is fitted in a stationary cylinder 61 and is connected by a rod 62 to a member 63 of a machine of which only a portion of member 63 has been shown.

Motor 60—62 may be energized by liquid supplied thereto from a reversible variable displacement pump such as the pump 4 of the drive shown in Fig. 1 by merely connecting channels 5 and 6 to opposite ends of cylinder 61 or, as shown, it may be energized by liquid supplied thereto from a unidirectional pump 64 which draws liquid from a reservoir 65 and discharges it into channel 66. Pump 64 has been indicated as being of the well known "constant pressure" type. That is, pump 64 will discharge liquid at a maximum rate until pump pressure reaches a predetermined maximum and then it will automatically reduce its displacement until it is discharging just enough liquid to maintain that maximum pressure constant.

The flow of liquid to and from motor 60—62 is controlled by a flow regulating valve 67 which is fitted in a stationary cylinder 68 to which channel 66 is connected. Cylinder 68 has two annular grooves or ports 69 and 70 formed therein at opposite sides of channel 66 and connected, respectively, to opposite ends of cylinder 61 by two channels 71 and 72. Cylinder 68 also has two annular grooves or ports 73 and 74 formed therein axially outward from ports 69 and 70 respectively and connected to a drain channel 75 which discharges into reservoir 65. Ports 69 and 70 are normally blocked, respectively, by two pistons 76 and 77 which are formed upon valve 67 and have been shown as being of exactly the same width as ports 69 and 70 but they may have a slightly negative lap.

The arrangement is such that, when valve 67 is moved toward the right from its neutral position, liquid will flow from pump 64 through channel 66, cylinder 68 and channel 71 to the head end of cylinder 61 and cause piston 60 and rod 62 to advance member 63 and the liquid expelled from cylinder 61 by piston 60 will flow through channel 72, cylinder 68 and channel 75 into reservoir 65. When valve 67 is moved toward the left from its neutral position, liquid will flow from pump 64 through channel 66, cylinder 68 and channel 72 to the rod end of cylinder 61 and cause piston 60 and rod 62 to retract member 63 and the liquid expelled from cylinder 61 by piston 60 will flow through channel 71, cylinder 68 and channel 75 into reservoir 65.

Since the mechanism for shifting valve 67 is substantially the same as the mechanism for shifting the slideblock of pump 4, like parts have been indicated by like reference numerals and corresponding parts have been indicated by adding the exponent "a" to the reference numerals of the corresponding parts shown in Fig. 4.

As shown, valve 67 is shifted in one direction or the other by a hydraulic servo-motor including a piston 18, which engages the left end of valve 67 and is fitted in cylinder 19 carried by cylinder 68, and a much larger piston 20 which engages the right end of valve 67 and is fitted in a cylinder 21 carried by cylinder 68.

Liquid for operating the servo-motor is supplied by gear pump 22ᵃ which draws liquid from reservoir 65 and discharges it into a channel 23ᵃ. The liquid discharged by gear pump 22ᵃ in excess of requirements is exhausted through a relief valve 24ᵃ which enables gear pump 22ᵃ to maintain a constant low pressure in channel 23ᵃ. Gear pump 22ᵃ, channel 23ᵃ and relief valve 24ᵃ have been shown separate from pump 64 but in practice they are arranged within the casing thereof and gear pump 22ᵃ is driven in unison with pump 64 as is customary. Channel 23ᵃ has connected thereto a branched channel 25 which has one of its branches connected to cylinder 19 and another branch connected to cylinder 21 in communication with a groove 26 formed therein so that cylinder 19 and groove 26 are continuously supplied with liquid at gear pump pressure.

Piston 20 is provided with an axial bore 30 having three annular grooves or ports 31, 32 and 33 formed in the wall thereof. Port 31 communicates through a duct 34 with groove 26. Port 32 communicates through a duct 35 with the outer portion of cylinder 21. Port 33 is connected to drain as by being open to the inner portion of cylinder 21 which is open to drain groove 73.

Communication between port 32 and ports 31 and 33 is controlled by a pilot valve 36 having three spaced apart pistons formed thereon and closely fitted in bore 30. The center piston of valve 36 normally blocks port 32 and it has been shown as being of exactly the same width as port 32 but it may have a slightly negative lap. The servo-motor functions in exactly the same manner as the servo-motor shown in Fig. 2 and previously described.

Pilot valve 36 is urged toward the right by a spring 37 which is arranged in bore 30 and holds the stem of valve 36 against a small control piston 38 which is fitted in a stationary cylinder 39 and urged against the stem of valve 36 by a weak spring 40. Movement of control piston 38 is effected by a hydraulic differential which is the same as that shown in Fig. 1 and includes two hydraulic tachometers or pilot pumps 9 and 11 and two channels 46 and 47 which connect pumps 9 and 11 in series and form therewith a substantially closed hydraulic circuit.

Channel 47 has connected thereto a branch of channel 25 through which gear pump liquid is supplied to keep the pilot pump circuit flooded with liquid at a constant pressure. Channel 46 is connected to control cylinder 39 by a channel 45 which is connected by a channel 50 to a cylinder 49 carried by cylinder 19. Cylinder 49 has a piston 51 fitted therein and urged by a spring 52 against one end of a push rod 53 which extends through the end wall of cylinder 19 and has its other end in contact with piston 18.

Pilot pump 9 is driven at a speed proportional to but relatively higher than the speed of member 63. As shown, pump 9 is driven through a reduction gear 80 by a pinion 81 which meshes with a rack 82 fixed to and movable with piston rod 62.

Pilot pump 11 is driven from a reference element 83 at such a speed that the rate at which one pilot pump discharges liquid will be exactly equal to the rate at which the other pilot pump consumes liquid. Reference element 83 has been shown as being a reciprocatory rack and pump 11 has been shown as being driven through a reduction gear 84 by a pinion 85 which meshes with rack 83 but pump 11 may be driven from a rotary reference element as shown in Fig. 1.

The hydraulic differential will effect operation of pilot valve 36 in the same manner as in the drive shown in Fig. 1 and thereby cause member 63 to be driven at a speed proportional to the speed of the reference element and the phase relation between member 63 and the reference element to be maintained in the same manner as in the drive shown in Fig. 1.

The invention herein set forth may be modified in various other ways without departing from the scope of the invention which is hereby claimed as follows.

I claim:

1. A hydraulic drive, for driving a machine at a speed proportional to the speed of a reference element, comprising a hydraulic motor connected to said machine, a main pump for supplying liquid to said motor to energize the same, fluid channels connecting said pump to said motor and forming therewith a hydraulic transmission, said transmission having a member for controlling the flow of liquid to said motor and shiftable in opposite directions to vary the rate of flow, hydraulic servo-motor means for shifting said member, a source of pressure liquid, means for supplying liquid from said source to said servo-motor means including a follow-up type pilot valve for controlling the flow of liquid to and from said servo-motor means and normally occupying a neutral position in which it blocks said flow, a first pilot pump driven by said motor, a second pilot pump driven by said reference element, two fluid channels connecting said pilot pumps in series and forming therewith a substantially closed hydraulic circuit, stationary cylinder means hydraulically connected to the first side of said circuit, a pilot piston fitted in said cylinder means with one side engaging the stem of said valve and its other side exposed to the pressure in said first side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

2. A hydraulic drive, for driving a machine at a speed proportional to the speed of a reference element, comprising a hydraulic motor connected to said machine, a main pump for supplying liquid to said motor to energize the same, fluid channels connecting said pump to said motor and forming therewith a hydraulic transmission, said transmission having a member for controlling the flow of liquid to said motor and shiftable in opposite directions to vary the rate of flow, hydraulic servo-motor means for shifting said member, a source of pressure liquid, means for supplying liquid from said source to said servo-motor means including a follow-up type pilot valve for controlling the flow of liquid to and from said servo-motor means and normally occupying a neutral position in which it blocks said flow, a first pilot pump driven by said motor, a second pilot pump driven by said reference element, two fluid channels connecting said pilot pumps in series and forming therewith a substantially closed hydraulic circuit, a third fluid channel connecting said source to a first side of said circuit for supplying liquid thereto to supercharge said pilot pumps, stationary cylinder means hydraulically connected to the second side of said circuit, a pilot piston fitted in said cylinder means with one side engaging the stem of said valve and its other side exposed to the pressure in said second side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

3. A hydraulic drive, for driving a machine at a speed proportional to the speed of a reference element, comprising a hydraulic motor connected to said machine, a main pump for supplying liquid to said motor to energize the same, fluid channels connecting said pump to said motor and forming therewith a hydraulic transmission, said transmission having a member for controlling the flow of liquid to said motor and shiftable in opposite directions to vary the rate of flow, hydraulic servo-motor means for shifting said member including a large piston, a source of pressure liquid, means for supplying liquid from said source to said servo-motor means including a pilot valve fitted in said large piston and forming therewith a follow-up valve mechanism for controlling the flow of liquid to and from said large piston and normally occupying a neutral position in which it blocks said flow, a first pilot pump driven by said motor, a second pilot pump driven by said reference element, two fluid channels connecting said pilot pumps in series and forming therewith a substantially closed hydraulic circuit, stationary cylinder means hydraulically connected to the first side of said circuit, a pilot piston fitted in said cylinder means with one side engaging the stem of said valve and its other side exposed to the pressure in said first side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

4. A hydraulic drive, for driving a machine at a speed proportional to the speed of a reference element, comprising a hydraulic motor connected to said machine, a main pump for supplying liquid to said motor to energize the same, fluid channels connecting said pump to said motor and forming therewith a hydraulic transmission, said transmission having a member for controlling the flow of liquid to said motor and shiftable in opposite directions to vary the rate of flow, hydraulic servo-motor means for shifting said member including a large piston, a source of pressure liquid, means for supplying liquid from said source to said servo-motor means including a pilot valve fitted in said large piston and forming therewith a follow-up valve mechanism for controlling the flow of liquid to and from said large piston and normally occupying a neutral position in which it blocks said flow, a first pilot pump driven by said motor, a second pilot pump driven by said reference element, two fluid channels connecting said pilot pumps in series and forming therewith a substantially closed hydraulic circuit, a third fluid channel connecting said source to a first side of said circuit for supplying liquid thereto to supercharge said pilot pumps, stationary cylinder means hydraulically connected to the second side of said circuit, a pilot piston fitted in said cylinder means with one side engaging the stem of said valve and its other side exposed to the pressure in said second side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

5. A hydraulic drive, for driving a machine at a speed proportional to the speed of a reference element, comprising a hydraulic motor connected to said machine, a main pump hydraulically connected to said motor for supplying liquid thereto to enable said motor to drive said machine, said pump having a displacement varying member and servo-motor means for shifting said member to vary pump displacement and thereby vary the speed of said machine, a source of pressure liquid, means for supplying liquid from said source to said servo-motor means including a follow-up type pilot valve for controlling the flow of liquid to and from said servo-motor means and normally occupying a neutral position in which it blocks said flow, a first pilot pump driven by said motor, a second pilot pump driven by said reference element, two fluid channels connecting said pilot pumps in series and forming therewith a substantially closed hydraulic circuit, cylinder means carried by the casing of said main pump and connected to the first side of said circuit, a pilot piston fitted in said cylinder means with one side engaging the stem of said valve and its other side exposed to the pressure in said first side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

6. A hydraulic drive, for driving a machine at a speed proportional to the speed of a reference element, comprising a hydraulic motor connected to said machine, a main pump hydraulically connected to said motor for supplying liquid thereto to enable said motor to drive said machine, said pump having a displacement varying member and servo-motor means for shifting said member to vary pump displacement and thereby vary the speed of said machine, a source of pressure liquid, means for supplying liquid from said source to said servo-motor means including a follow-up type pilot valve for controlling the flow of liquid to and from said servo-motor means and normally occupying a neutral position in which it blocks said flow, a first pilot pump driven by said motor, a second pilot pump driven by said reference element, two fluid channels connecting said pilot pumps in series and forming therewith a substantially closed hydraulic circuit, a third fluid channel connecting said source to a first side of said circuit for supplying liquid thereto to supercharge said pilot pumps, cylinder means carried by the casing of said main pump and connected to the second side of said circuit, a pilot piston fitted in said cylinder means with one side engaging the stem of said valve and its other side exposed to the pressure in said second side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

7. A hydraulic drive, for driving a machine at a speed proportional to the speed of a reference element, comprising a hydraulic motor connected to said machine, a main pump hydraulically connected to said motor for supplying liquid thereto to enable said motor to drive said machine, said pump having a member shiftable in opposite directions selectively to vary pump displacement and thereby vary the speed of said machine and also having servo-motor means for shifting said member including a large piston, a source of pressure liquid, means for supplying liquid from said source to said servo-motor means including a pilot valve fitted in said large piston and forming therewith a follow-up valve mechanism for controlling the flow of liquid to and from said large piston and normally occupying a neutral position in which it blocks said flow, a first pilot pump driven by said motor, a second pilot pump driven by said reference element, two fluid channels connecting said pilot pumps in series and forming therewith a substantially closed hydraulic circuit, cylinder means carried by the casing of said main pump and connected to the first side of said circuit, a pilot piston fitted in said cylinder means with one side engaging the stem of said valve and its other side exposed to the pressure in said first side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

8. A hydraulic drive, for driving a machine at a speed proportional to the speed of a reference element, comprising a hydraulic motor connected to said machine, a main pump hydraulically connected to said motor for supplying liquid thereto to enable said motor to drive said machine, said pump having a member shiftable in opposite directions selectively to vary pump displacement and thereby vary the speed of said machine and also having servo-motor means for shifting said member including a large piston, a source of pressure liquid, means for supplying liquid from said source to said servo-motor means including a pilot valve fitted in said large piston and forming therewith a follow-up valve mechanism for controlling the flow of liquid to and from said large piston and normally occupying a neutral position in which it blocks said flow, a first pilot pump driven by said motor, a second pilot pump driven by said reference element, two fluid channels connecting said pilot pumps in series and forming therewith a substantially closed hydraulic circuit, a third fluid channel connecting said source to a first side of said circuit for supplying liquid thereto to supercharge said pilot pumps, cylinder means carried by the casing of said main pump and connected to the second side of said circuit, a pilot piston fitted in said cylinder means with one side engaging the stem of said valve and its other side exposed to the pressure in said second side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

9. A hydraulic drive, for driving a machine at a speed proportional to the speed of a reference element, comprising a hydraulic motor connected to said machine, a main pump hydraulically connected to said motor for supplying liquid thereto to enable said motor to drive said machine, said pump having a member shiftable in opposite directions selectively to vary pump displacement and thereby vary the speed of said motor and being continuously urged in a direction to decrease pump displacement, said pump also having a servo-motor including a large piston engaging said member for moving it in a direction to increase pump displacement, a source of pressure liquid, means for supplying liquid from said source to said servo-motor including a pilot valve fitted in said large piston and forming therewith a follow-up valve mechanism for controlling the flow of liquid to and from said large piston and normally occupying a neutral position in which it blocks said flow, a first pilot pump driven by said motor, a second pilot pump driven by said reference element, two fluid channels connecting said pilot pumps in series and forming therewith a substantially closed hydraulic circuit, cylinder means carried by the casing of said main pump and connected to the first side of said circuit, a pilot piston fitted in said cylinder means with one side engaging the stem of said valve and its other side exposed to the pressure in said first side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

10. A hydraulic drive, for driving a machine at a speed proportional to the speed of a reference element, comprising a hydraulic motor connected to said machine, a main pump hydraulically connected to said motor for supplying liquid thereto to enable said motor to drive said machine, said pump having a member shiftable in opposite directions selectively to vary pump displacement and thereby vary the speed of said motor and being continuously urged in a direction to decrease pump displacement, said pump also having a servo-motor including a large piston engaging said member for moving it in a direction to increase pump displacement, a source of pressure liquid, means for supplying liquid from said source to said servo-motor including a pilot valve fitted in said large piston and forming therewith a followup valve mechanism for controlling the flow of liquid to and from said large piston and normally occupying a neutral position in which it blocks said flow, a first pilot pump driven by said motor, a second pilot pump driven by said reference element, two fluid channels connecting said pilot pumps in series and forming therewith a substantially closed hydraulic circuit, a third fluid channel connecting said source to a first side of said circuit for supplying liquid thereto to supercharge said pilot pumps, cylinder means carried by the casing of said main pump and connected to the second side of said circuit, a pilot piston fitted in said cylinder means with one side engaging the stem of said valve and its other side exposed to the pressure in said second side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, and a cylinder wall fitted in said cylinder means and movable with said member for keeping the volume of liquid in said cylinder means constant except for the very small quantity required to enable said pilot piston to effect a very slight movement of said valve.

11. A hydraulic drive, for driving a machine at a speed proportional to the speed of a reference element, comprising a hydraulic motor connected to said machine, a main pump hydraulically connected to said motor for supplying liquid thereto to enable said motor to drive said machine, said pump having a member shiftable in opposite directions selectively to vary pump displacement and thereby vary the speed of said motor and being continuously urged in a direction to decrease pump displacement, said pump also having a servo-motor including a large piston engaging said member for moving it in a direction to increase pump displacement, a source of pressure liquid, means for supplying liquid from said source to said servo-motor including a pilot valve fitted in said large piston and forming therewith a follow-up valve mechanism for controlling the flow of liquid to and from said large piston and normally occupying a neutral position in which it blocks said flow, a first pilot pump driven by said motor, a second pilot pump driven by said reference element, two fluid channels connecting said pilot pumps in series and forming therewith a substantially closed hydraulic circuit, a first cylinder carried by said servo-motor and connected to the first side of said circuit, a pilot piston fitted in said first cylinder with one side engaging the stem of said valve and its other side exposed to the pressure in said first side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, a second cylinder of the same diameter as said first cylinder carried by the casing of said main pump at the side thereof opposite to said servo-motor and hydraulically connected to said first cylinder, and a piston fitted in said second cylinder and movable with said member for keeping the volume of liquid in said first and second cylinders constant except for the very small quantity required to enable said pilot piston to effect a very slight movement of said valve.

12. A hydraulic drive, for driving a machine at a speed proportional to the speed of a reference element, comprising a hydraulic motor connected to said machine, a main pump hydraulically connected to said motor for supplying liquid thereto to enable said motor to drive said machine, said pump having a member shiftable in opposite directions selectively to vary pump displacement and thereby vary the speed of said motor and being continuously urged in a direction to decrease pump displacement, said pump also having a servomotor including a large piston engaging said member for moving it in a direction to increase pump displacement, a source of pressure liquid, means for supplying liquid from said source to said servo-motor including a pilot valve fitted in said large piston and forming therewith a follow-up valve mechanism for controlling the flow of liquid to and from said large piston and normally occupying a neutral position in which it blocks said flow, a first pilot pump driven by said motor, a second pilot pump driven by said reference element, two fluid channels connecting said pilot pumps in series and forming therewith a substantially closed hydraulic circuit, a third fluid channel connecting said source to a first side of said circuit for supplying liquid thereto to supercharge said pilot pumps, a first cylinder carried by said servo-motor and connected to the second side of said circuit, a pilot piston fitted in said first cylinder with one side engaging the stem of said valve and its other side exposed to the pressure in said second side of said circuit, yieldable means engaging said valve and urging it toward said pilot piston, the pressure acting upon said pilot piston causing it to hold said valve in its neutral position when the delivery rate of one pilot pump is equal to the intake rate of the other pilot pump but a variation between the delivery rate of one pilot pump and the intake rate of the other pilot pump will cause said pilot piston to effect movement of said valve and thereby effect movement of said member, a second cylinder of the same diameter as said first cylinder carried by the casing of said main pump at the side thereof opposite to said servo-motor and hydraulically connected to said first cylinder, and a piston fitted in said second cylinder and movable with said member for keeping the volume of liquid in said first and second cylinders constant except for the very small quantity required to enable said pilot piston to effect a very slight movement of said valve.

No references cited.